United States Patent [19]

Simnovec et al.

[11] 4,052,652
[45] Oct. 4, 1977

[54] APPARATUS FOR TIGHTENING AND RELEASING A PRESSURE VESSEL CLAMPING NUT

[75] Inventors: Andre Simnovec, Herne; Martin Wiebe, Hattingen; Willi Berndt, Herne, all of Germany

[73] Assignee: Schwing Hydraulik Elektronik KG, Herne, Germany

[21] Appl. No.: 611,610

[22] Filed: Sept. 24, 1975

[30] Foreign Application Priority Data

Oct. 15, 1974 Germany ............................ 2449009

[51] Int. Cl.² .............................................. H02H 7/08
[52] U.S. Cl. .................................................. 318/476
[58] Field of Search ............... 318/434, 476; 317/14 C, 317/13 R

[56] References Cited

U.S. PATENT DOCUMENTS

| | | | |
|---|---|---|---|
| 3,812,408 | 5/1974 | Penn et al. | 318/476 |
| 3,845,373 | 10/1974 | Totsu et al. | 318/434 |
| B 504,405 | 4/1976 | Kimmel et al. | 317/13 R |

*Primary Examiner*—Robert K. Schaefer
*Assistant Examiner*—John J. Feldhaus
*Attorney, Agent, or Firm*—Malcolm W. Fraser

[57] ABSTRACT

Apparatus for tightening and releasing one of the clamping nuts which act to maintain a pre-established pressure-tight sealing of a flanged reactor pressure vessel, the bolts for which clamping nuts are held and pretensioned in the flange of the vessel. The clamping nut has teeth and is turned on its bolt, via a reduction gearing cooperating with the teeth, by a three phase motor whose rotor has the smallest number of poles for a small moment of inertia and a high speed of rotation. A connecting lead for the motor has a current sensor disposed in one phase thereof, and a triac contactor responsive to an output signal from the current sensor and arranged to open-circuit the connection lead when the sensed current exceeds a predetermined threshold at a limit position of the nut. The apparatus also includes an override means which acts to prevent the motor being automatically switched off in response to start-up current during a preselected period from switch-on of the motor. The nut is not overtightened, since the stored energy in the rotating masses is low, and can be readily released by the apparatus.

6 Claims, 8 Drawing Figures

APPARATUS FOR TIGHTENING AND RELEASING A PRESSURE VESSEL CLAMPING NUT

BACKGROUND OF THE INVENTION

This invention relates to an apparatus for tightening and releasing a pressure vessel clamping nut, i.e. one of several nuts which act to maintain a preestablished pressure-tight sealing of for example a reactor pressure vessel, the bolts for which nuts are held and pretensioned in a flange of the pressure vessel.

It is known for such apparatus to comprise an electric motor connected to a gearing adapted to co-operate with a teeth on the nut. The use of an electric motor for the drive requires less outlay than that of a hydraulic motor. Also, for a reactor pressure vessel, there is no danger of radioactive contamination of any oil escaping from a leak.

With a known apparatus the nut can be tightened into its clamping position on the pretensioned bolt, but a difficulty arises when the nut is to be released from its clamping position. This is that the electric motor, when tightening the nut, cannot be switch off so precisely that for subsequently releasing the nut it is able to provide a starting torque greater than the tightening torque of the nut. The same difficulty is encountered where there is interposed between the electric motor and the nut a coupling, i.e. clutch, which is operated by control pulses.

The use of safety couplings in conjunction with a switching-off of the motor in dependence upon the increase in current which occurs in the event of increase in the tightening torque has also proved unsuccessful, because an accurate monitoring of the tightening torque is not possible.

SUMMARY

According to the present invention there is provided an apparatus for tightening and releasing one of several nuts which act to maintain a pre-established pressure-tight sealing of a pressure vessel, the bolts for which nuts are held and pretensioned in a flange of the pressure vessel, the apparatus comprising a three-phase motor connected to reduction gear means adapted to co-operate with teeth on the nut, a current sensing means disposed in one phase of a connecting lead for the motor and arranged to provide an output signal when the sensed current exceeds a preselected threshold, a contacting means disposed in the connecting lead and responsive to the output signal from the current sensing means to open-circuit the connection lead for switching off the motor at a limit position of the nut, and an adjustable duration overriding means arranged such as to provide an override facility whereby the motor cannot be automatically switched off in response to a current overload condition during a preselected period from switch-on of the motor, and wherein the rotor of the motor has the smallest possible number of poles for a small moment of inertia and a high speed of rotation.

With this apparatus the tightening torque is smaller than in the case of the known apparatus, because essentially it is determined only by the power exerted by the three-phase motor during the tightening. The energy stored in the rotating masses is relatively small as compared with prior art arrangements, because the rotor of the three-phase motor, which is designed for the smallest possible number of poles, has a low moment of inertia and because by virtue of the interposed reduction gearing the nut only rotates slowly. As a result, the tightening torque is less than with known arrangements and the three-phase motor can readily develop the starting torque necessary for releasing the nut. The three-phase motor can be designed for operation at mains frequency, e.g. 50 Hz. However, there is advantage in designing the motor for higher frequencies, e.g. 400 Hz, since for the same output the motor can be made smaller.

During the starting of the three-phase motor, the adjustable duration overriding means overrides the operation of the current sensing means and prevents the activation of the contacting means. The overriding means is either arranged to divert the current from the current sensing means or is arranged to de-energize the current sensing means whereby the motor is not switched off in response to starting current greater than said preselected threshold. Only after the starting procedure is completed and the motor is only consuming the current necessary for turning the nut (i.e. a current less than said preselected threshold) does the overriding means stop overriding the operation of the current sensing means.

Where the switching-off of the motor is effected in dependence upon the increase of current, the total switching time is the combination of the reaction times of the current sensing means (alternatively called an overload switch) and of the contacting means. While the switching time of an overload switch is about 1 ms, a contacting means comprising a mechanical contactor can have a switching time in the range of 5 to 15 ms. These long switching times can be considerably reduced if the contacting means is in the form of a triac circuit, whose switching time is in the order of nanoseconds. With the use of a triac circuit there are achieved smaller tightening torques of the nut, because after the reaction of the overload switch the motor consumes practically no more current.

It is advantageous for there to be provided in the connection lead a reversing means which is controlled by a selector means, which in the case of the provision of two current-overload switches reacting at different predetermined currents also connects the appropriate overload switch to be used in each case to the contactor. By operating the selector means, the direction of rotation of the electric motor can be changed. The adjustable duration overriding means may comprise a simple on-off switch arranged in parallel with the or each overload switch. The overriding means alternatively may comprise a two-way switch connected in series with the or each overload switch and having its outputs so connected that the phase lead can be connected directly to the motor or via the or each overload switch. In these cases, the design of the overriding means must take into account the large starting currents consumed by the motor.

Where the or each current sensing means comprises an electrical circuit energized from a power supply, advantageously the overriding means is arranged to disconnect the electrical circuit from its power supply. Since the electrical power consumed by such a current sensing means is less than that the power consumed by the motor, switches of a lower current rating can be used and these can be of the non-contacting type (i.e. solid state switches), which take up only a small amount of space. Consequently, it becomes possible for the adjustable duration overriding means together with the current sensing means and other small-volume components mounted in a small housing connected to, e.g. the terminal box of the electric motor. It will be appreciated that for controlling the actuation of the switch or switches the overriding means comprises a timing mechanism arranged to be actuated synchronously with the motor.

If the apparatus is arranged along with a number of similar ones on for example a reactor pressure vessel, then the corresponding nuts must be tightened or released by the individual units not only uniformly but also simultaneously. For control of this there is provided at the motor or at the reduction gear means, means responsive to rotational movement and arranged to provide an output signal. This signal can be processed in a central control system, which either automatically reverses the tightening or releasing of the nuts or otherwise provides appropriate warning signals for an operator.

The movement responsive means may comprise a reduction gearing having limit switches which make possible a two-step control, or arranged to drive a potentiometer, which makes possible a steadying control. Alternatively, the movement responsive means may comprise a multiple turn potentiometer coupled to the reduction gear means.

DETAILED DESCRIPTION

Figure 1:
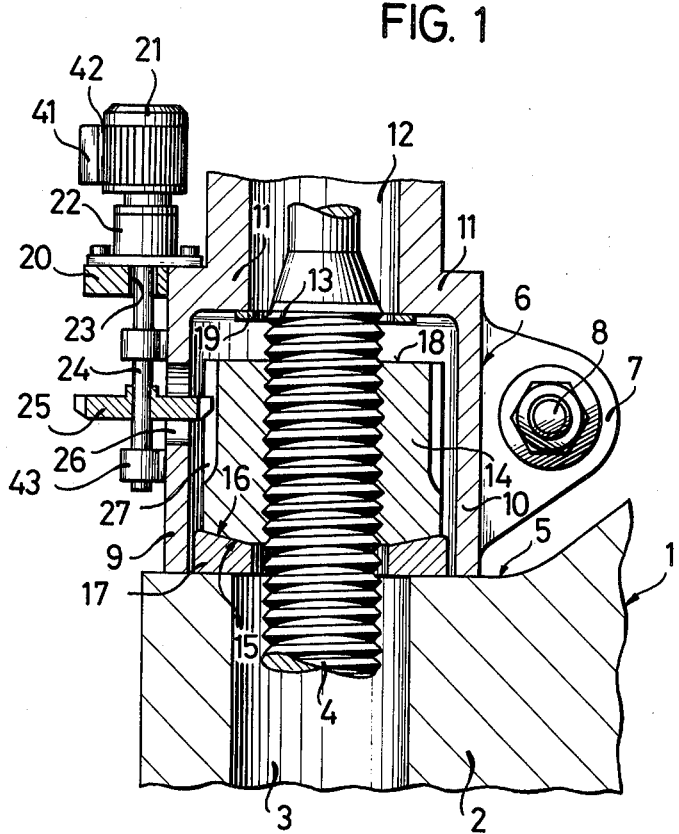
FIG. 1 is a section through a part of a reactor cover, with an apparatus for tightening and releasing a nut.

The cover 1 of a reactor pressure vessel illustrated in FIG. 1 has a flange 2 with a plurality of holes 3 arranged along the periphery of the cover. Through each of these holes 3 there projects a threaded bolt 4, which is secured in the non-illustrated companion flange of the reactor pressure vessel. On the top face 5 of the flange 2 there is supported a tensioning ring 6 which is made up of segments. Each segment has flanges 7 at its ends, which are held together by means of bolts 8.

Only the lower part of the tensioning ring 6 is shown in the drawing. In the upper part of the tensioning ring 6 there is a hydraulic tensioning device of known construction, by means of which the bolt 4 is pretensioned so as to seal flange 2 against its companion flange. The lower part of the tensioning ring 6 has a U-shaped cross-section and transmits the tensioning force via the ends of its U-arms 9, 10 to the top face 5 of the flange 2. In the web 11 of the U-shaped there is an aperture 12 for the bolt 4.

The bolt 4 has in its portion extending through the tensioning ring 6 an external thread 13 for a clamping nut 14. This nut 14 is conical in form on its end face 15 facing the flange 2, and for the pressure-tight clamping of the reactor vessel it is tightened with its conical end face 15 against a correspondingly shaped support face 16 of a seat element 17 situated on the top face 5 of the flange 2 around the aperture 3. The tightening of the nut is effected after the bolt 4 is pretensioned thus the nut acts to maintain the preselected tension in the bolt and thus maintain the sealing of the pressure vessel.

The other end face 18 of the nut 14 is flat, and with it there is associated an abutment ring 19 on the underside of the U-web 11.

To a bracket 20 projecting out beyond the arm 9 of the tensioning ring 6 there is attached a three-phase motor 21 with a reduction gearing 22 flanged thereto. The bracket 20 has an aperture 23 for the output shaft 24 of the reduction gearing 22.

To the end of the output shaft 24 there is attached a pinion 25, which projects through a slot 26 in the U-arm 9 of the tensioning ring 6 and which is in engagement with spur teeth 27 on the nut 14. The spur teeth 27 extends over the major part of the length of the nut 14, so that during the displacement brought about by the rotation of the nut 14 the pinion 25 always remains in engagement with the spur toothing 27. The reduction gearing 22 together with the pinion 25 constitutes a reduction gear means of the present invention.

The three-phase motor 21 is a bipolar three-phase motor which at nominal output consumes a current of about 0.71 A. During starting, this motor may consume a current of up to 4.3 A. Its starting torque is also correspondingly high. The flywheel effect $GD^2$ of its rotor, corresponding to the moment of inertia, is 0.0008 kp m². The motor is designed for 10% duty cycle. The reduction gearing 22 steps down the speed of rotation of the three-phase motor 21 by a ratio of 1:156. Thus for a nominal speed of the three-phase motor 21 of 3000 rpm and for equal pitch-circle diameters of the toothing of the pinion 25 and nut 14, there is obtained a speed of rotation of the nut 14 of about 17 rpm.

Figure 2:
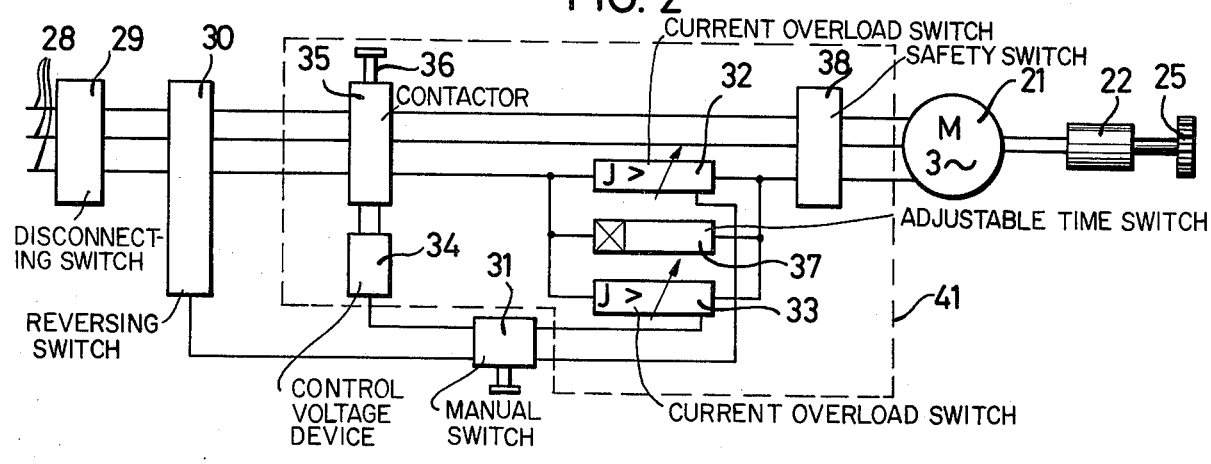
FIG. 2 is a circuit diagram in block form of the electric drive for the apparatus in accordance with FIG. 1.

In FIG. 2 there is shown in block form the circuit diagram of the electric drive by means of the apparatus of FIG. 1. The circuit is arranged such that the three-phase motor 21 is switched off when the current consumed by the three-phase motor 21 exceeds a predetermined threshold which corresponds to a predetermined tightening torque of the nut 14.

The motor 21 is delta-connected to the three phases of a connection lead 28. In the connection lead 28 there is a manually operable disconnecting switch 29, by which the three-phase motor 21 can be connected to the three-phase mains or disconnected therefrom.

To the disconnecting switch 29 there is connected a reversing means in the form of reversing switch 30, the actuation of which brings about a change in the direction of rotation of the three-phase motor 21. The reversing switch 30 is controlled by a selector means in the form of a manually operated switch 31. This switch 31 also contains a relay which connects the outputs of two current-overload switches 32, 33 (which will be described further below) in dependence upon the position of the reversing switch 30 to a device 34 for producing a control voltage for a contactor 35 arranged in the connection lead 28. The contactor 35 also has a manual operation means 36.

The overload switches 32, 33 (which constitute current sensing means of the present invention) are connected parallel to one another in one phase of the connection lead 28. They consist of electric measuring circuits in which an adjustable threshold or reference value of current is compared to the current consumed by the three-phase motor 21. If the current consumed by the three-phase motor 21 exceeds the preselected threshold, the overload switches 32, 33 provide an output signal, as a result of which the control voltage in the device 34 is fed to the contactor 35, which thereupon breaks the connection between the connection lead 28 and the three-phase motor 21. The contactor 35 and the device 34 consititute a contacting means of the present invention.

The two overload switches 32, 33 have their preselected current thresholds set at different values since a different tightening torque is required depending whether end face 15 is to mate with support face 16 or whether end face 18 is to abut the abutment ring 19.

Parallel to the overload switches 32, 33 there is arranged an adjustable time switch 37, which is operated together with the disconnecting switch 29 and which prevents the starting current of the three-phase motor 21, which is very high after it is switched on, from flowing by way of the overload switches 32, 33.

Additionally, there is provided a safety swtich 38, which becomes operative in the event of overheating of the three-phase motor 21.

Figure 3:
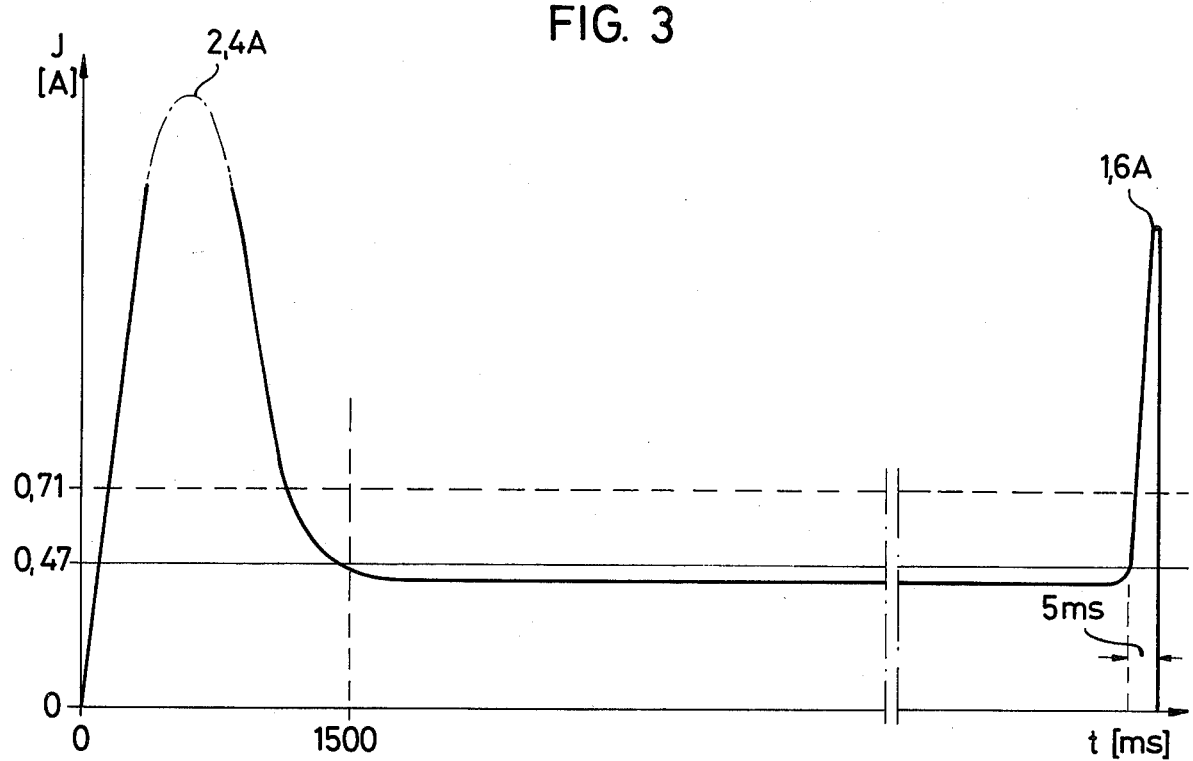
FIG. 3 is a graph of current versus time for the motor of the apparatus of FIG. 1.

The functioning of the circuit described above is apparent from the diagram in accordance with FIG. 3. In FIG. 3 there is shown the current consumption of the three-phase motor 21, from switch-on of the motor 21 and loosening of the nut 14 from the seat element 17 to tightening of the nut 14 against the abutment ring 19 and subsequent switch-off of the motor 21. As can be seen from the diagram, the current consumed by the three-phase motor 21 rises very rapidly after the disconnecting switch 29 and time switch 37 are switched on, reaching a maximum value of about 2.4A. The starting torque delivered in this period by the three-phase motor 21 is sufficient to release the nut 14 from its seat and to impart rotation to the rotor of the motor, the reduction gearing 22, the pinion 25 and the nut 14. After a preselected period of about 1500 ms, the current consumed by the three-phase motor 21 has dropped to a value of about 0.4A, which is considerably below the current of about 0.71 A consumed at nominal output. At the end of this pre-selected period the time switch 37 is opened.

The current consumed by the three-phase motor 21 during rotation of the nut 14 also lies below the preselected threshold of 0.47 A at which the overload switch 32 is set, so that even after the opening of the time switch 37 the overload switch 32 provides no signal. Only when the end face 18 of the nut 14 comes up against the abutment ring 19, and the nut 14 and the components connected mechanically thereto are braked, does the current consumption of the three-phase motor 21 increase very rapidly as a result of the increase torque load. The pre-selected threshold at which the overload switch 32 is set is now exceeded and the overload switch 32 provides an output signal to the device 34, causing it to feed the control voltage to the contactor 32 which disconnects the three-phase motor 21 from the main. As is shown in the right-hand part of FIG. 3, the time interval between the reaction of the overload switch 32 and the disconnection of the three-phase motor from the main is about 5 ms. During this interval, the current consumed by the three-phase motor rises to 1.6 A.

The interval between the reaction of the overload switch 32 and the switching-off of the three-phase motor 21 can be substantially reduced by using instead of a mechanical contactor 35 a triac circuit, whose response time is in the order of nanoseconds. In this case, the rise in current after the reaction of the overload switch is correspondingly smaller.

The variation of the toque delivered by the motor as a function of time corresponds substantially to that of the current consumption shown in FIG. 3. The only difference is that the torque curve is to some extent phase-displaced in relation to the current curve due to the mechanical components which have to be accelerated or retarted.

Figure 4:
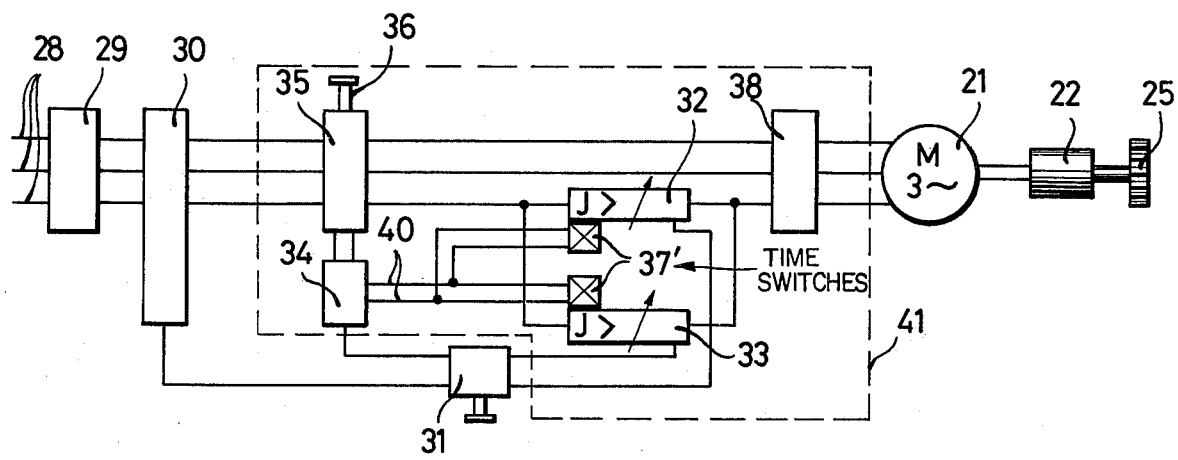
FIG. 4 is a circuit diagram in block form showing a modification of the apparatus of FIG. 1.

The circuit diagram of FIG. 4 is of a modified form of the apparatus of FIG. 1, and it basically corresponds to the circuit diagram of FIG. 2. Identical reference numerals are used for the identical parts. In contrast to the embodiment in accordance with FIG. 2, each current-overload switch 32, 33 has a time switch 37' which is arranged in the relevant current supply circuit 40 for each overload switch 32, 33. The time switches 37' are contactless in operation and have a very small overall volume, so that they are combined together with other components to form one unit 41 which is mounted adjacent a terminal box 42 of the electric motor 21 (FIG. 1). To the lower end of the output shaft 24, on the side of the pinion 25 remote from the motor, there is connected a movement responsive means constituted by tachometer 43, which is mounted on the arm 9 of the tensioning ring 6. From this tachometer 43 signal leads (not shown) run to a central control unit (not shown) which monitors whether all the nuts 14 provided on the reactor pressure vessel are being tightened or released simultaneously.

Figure 5:
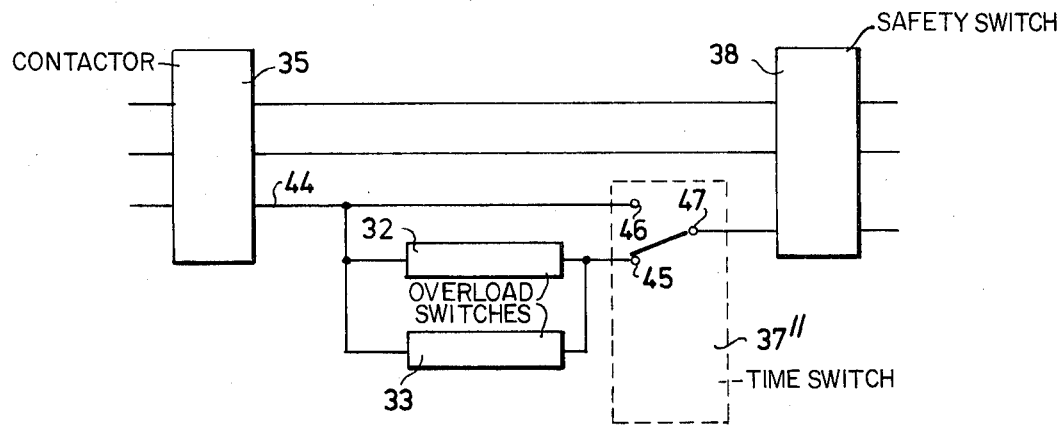
FIG. 5 is a diagram in block form showing another modification of part of the apparatus of FIG. 1.

In FIG. 5, the current-overload switches 32, 33 are connected in parallel with each other between a phase lead 44 of the connecting lead 28 and an output terminal 45 of a two-way switch forming part of time switch 37". The other output terminal 46 is connected to phase lead 44, and the pole 47 of the two-way switch is connected to the motor via safety switch 38.

In FIG. 2 the time switch 37 constitutes an adjustable duration overriding means, in FIG. 4 the time switches 37 together constitute such a means, and in FIG. 5 the time switch 37" constitutes such a means.

Whereas in FIG. 4 each current-overload switch has an associated time switch 37', it will be appreciated that the same effect can be obtained by the use of a single time switch arranged in the common lead of the supply circuit 40.

Figure 6:
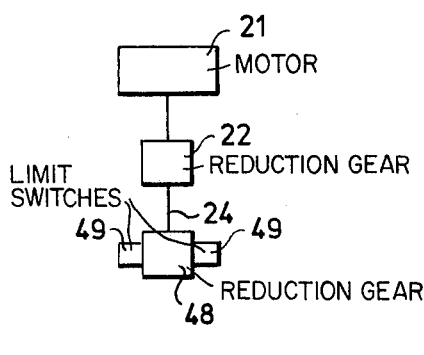
FIG. 6 shows in block form one embodiment of a movement responsive means.
Figure 7:
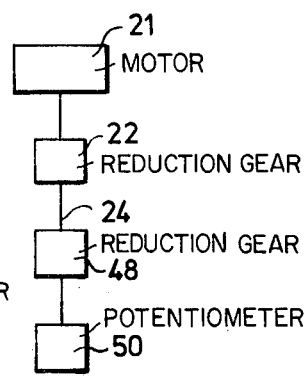
FIG. 7 shows in block form another embodiment of a movement responsive means.
Figure 8:
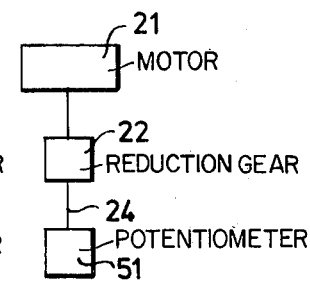
FIG. 8 shows in block form yet another embodiment of a movement responsive means.

FIG. 6 shows one form of tachometer 43 which comprises a reduction gearing 48 driven by shaft 24 and having limit switches 49. FIG. 7 shows another form of tachometer 43 which comprises a reduction gearing 48 driven by shaft 24 and coupled to a potentiometer 50. FIG. 8 shows yet another form of tachometer 43 which comprises a multiple turn potentiometer 51 driven by shaft 24.

We claim:

1. In a pressure vessel having a flange containing bolts held and pretensioned therein, said bolts having nuts which are tightened to maintain pre-established pressure-tight sealing of the vessel and released electromechanically, the apparatus comprising a clamping nut threadedly engaging a bolt and movable axially in one direction to effect pressure-tight clamping and to effect release in the opposite direction, longitudinally extending spur teeth formed on the outside of said nut in circular form, means providing limited longitudinal movement of said nut between tightening and releasing positions, a pinion engaging said spur teeth, a three-phase reversible electric motor driving said pinion, reduction gearing interposed between said motor and pinion, a connecting lead for said motor, a current sensing means disposed in one phase of said connecting lead and arranged to provide an output signal when the sensed current exceeds a pre-selected threshold, reversing means disposed in said connecting lead, selector means for controlling the reversing means to reverse the direction of rotation of said motor, a contacting means disposed in said connecting lead and responsive to the output signal from said current sensing means to open-circuit said connecting lead for switching off the motor at a limit position of the nut, and an adjustable duration overriding means providing an override facility preventing said motor from being automatically switched off in response to current overload during a pre-selected period from switch-on of said motor and when the motor rotor has the smallest possible number of poles for a small moment of inertia and high speed of rotation.

2. An apparatus as defined in claim 1, having a respective current sensing means for each direction of rotation of the motor, and wherein the selector means is arranged to connect the appropriate current sensing means to the contacting means, the current sensing means having different preselected current thresholds.

3. An apparatus as defined in claim 1 wherein the adjustable duration overriding means comprises a switch connected in parallel with the current sensing means, and an adjustable timing mechanism for controlling said switch; said timing mechanism being arranged to be actuated synchronously with the motor.

4. An apparatus as defined in claim 1 wherein the adjustable duration overriding means comprises a two-way switch connected in series with the current sensing means and having its outputs so connected that said one phase can be connected directly to the motor or via the current sensing means, and an adjustable timing mechanism for controlling said two-way switch, said timing mechanism being arranged to be actuated synchronously with the motor.

5. An apparatus as defined in claim 1 wherein the current sensing means comprises an electrical circuit and a power supply for energizing said electric circuit, and wherein the adjustable duration overriding means comprises a switching means arranged to disconnect said power supply for the electrical circuit whereby the current sensing means is de-energized for the duration of said preselected period.

6. An apparatus as defined in claim 1 wherein there is provided, at one of the motor and the reduction gear means, means responsive to rotational movement and arranged to provide an output signal.

* * * * *